US012548718B2

(12) United States Patent
Lu

(10) Patent No.: US 12,548,718 B2
(45) Date of Patent: Feb. 10, 2026

(54) AUTOMATIC TRANSFER SWITCH

(71) Applicant: KUTAI ELECTRONICS INDUSTRY CO., LTD., Kaohsiung (TW)

(72) Inventor: Wen-Feng Lu, Kaohsiung (TW)

(73) Assignee: KUTAI Electronics Industry Co., Ltd., Kaohsiung (TW)

( * ) Notice: Subject to any disclaimer, the term of this patent is extended or adjusted under 35 U.S.C. 154(b) by 231 days.

(21) Appl. No.: 18/493,940

(22) Filed: Oct. 25, 2023

(65) Prior Publication Data

US 2025/0140489 A1 May 1, 2025

(51) Int. Cl.
*H01H 9/26* (2006.01)
*H01H 3/28* (2006.01)

(52) U.S. Cl.
CPC ................ *H01H 9/26* (2013.01); *H01H 3/28* (2013.01); *H01H 2300/018* (2013.01)

(58) Field of Classification Search
CPC ...... H01H 9/26; H01H 3/28; H01H 2300/018; H01H 9/20
See application file for complete search history.

(56) References Cited

U.S. PATENT DOCUMENTS 10,643,804 B2 * 5/2020 Chen ........................ H01H 9/26
11,239,692 B2 * 2/2022 Lu .......................... H01H 19/00

FOREIGN PATENT DOCUMENTS

TW M491940 U 12/2014
TW M553490 U 12/2017

* cited by examiner

*Primary Examiner* — Lheiren Mae A Caroc
(74) *Attorney, Agent, or Firm* — Rosenberg, Klein & Lee

(57) ABSTRACT

An automatic transfer switch is provided. A transfer module is arranged between two power switches and disposed on a displacement mechanism which is in linear motion. The transfer module is provided with a seat in which two corresponding levers are mounted and electrically connected with a controller. The two levers are locked or released under control of the controller. Thereby the power switch is pulled or pushed selectively by the levers being locked or released. In combination with the controller used for setting a time delay during transfer between power sources, the power switch can be turned on/off or switched at the time required.

13 Claims, 15 Drawing Sheets

AUTOMATIC TRANSFER SWITCH

BACKGROUND OF THE INVENTION

Field of the Invention

The present invention relates to an automatic transfer switch, especially to an automatic transfer switch which can adjust a time delay during transfer between power sources.

Description of Related Art

Electricity is an essential part of modern life. Especially for medical industry and manufacturing industry, power supply products have more rigorous requirements for safety and continuous uptime and power interruption is not allowed. General power sources include a normal power source and standby power source and adequate power source is used according to users' needs. An automatic transfer switch is a device that shifts from one power source to another for continuous energy delivery.

Now an automatic transfer device is connected to a normal power source and a standby power source. The automatic transfer device includes a motor, a lever connected with the motor, a normal-end circuit breaker connected with the normal power source, and a standby-end circuit breaker connected with the standby power source. The motor can rotate clockwise or counterclockwise for driving the lever to pull the normal-end circuit breaker or the standby-end circuit breaker. Thus the normal power source or the standby power source is electrically connected selectively and the power source is switched.

However, the automatic transfer switch available now has several shortcomings including complicated circuit structure, higher equipment cost, etc. Refer to Taiwanese Pat. Pub. M491940 "automatic transfer switch" and M491940 "automatic transfer switch" applied by inventor of the present invention, both overcomes shortcomings of prior arts. The inventor finds that modern household appliances are highly diversified and equipment has more technological development. Thus once transfer of the normal power source and the standby power source in the automatic transfer device is out of order, connection with the normal power source and the standby power source at the same time will cause short circuit or load failure, which further leads to equipment damage or even explosion. Thereby time difference should be considered in response to the risk of equipment damage during transfer between power sources by the automatic transfer device.

SUMMARY OF THE INVENTION

Therefore, it is a primary object of the present invention to provide an automatic transfer switch able to adjust a time delay while transferring one power source to another power source.

In order to achieve the above object, an automatic transfer switch according to the present invention mainly includes a transfer module arranged between two power switches and disposed on a displacement mechanism which moves linearly. The transfer module is provided with a seat in which two corresponding levers are mounted and electrically connected with a controller. The two levers are locked or released under control of the controller. Thereby the power switch is pulled or pushed selectively by the levers being locked or released. In combination with the controller used for setting a time delay while transferring one power source to another power source, the power switch can be turned on/off or switched at the time required.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, features and functions of the present invention more clearly and completely, please refer to the following embodiments with related figures and reference signs.

Figure 1:
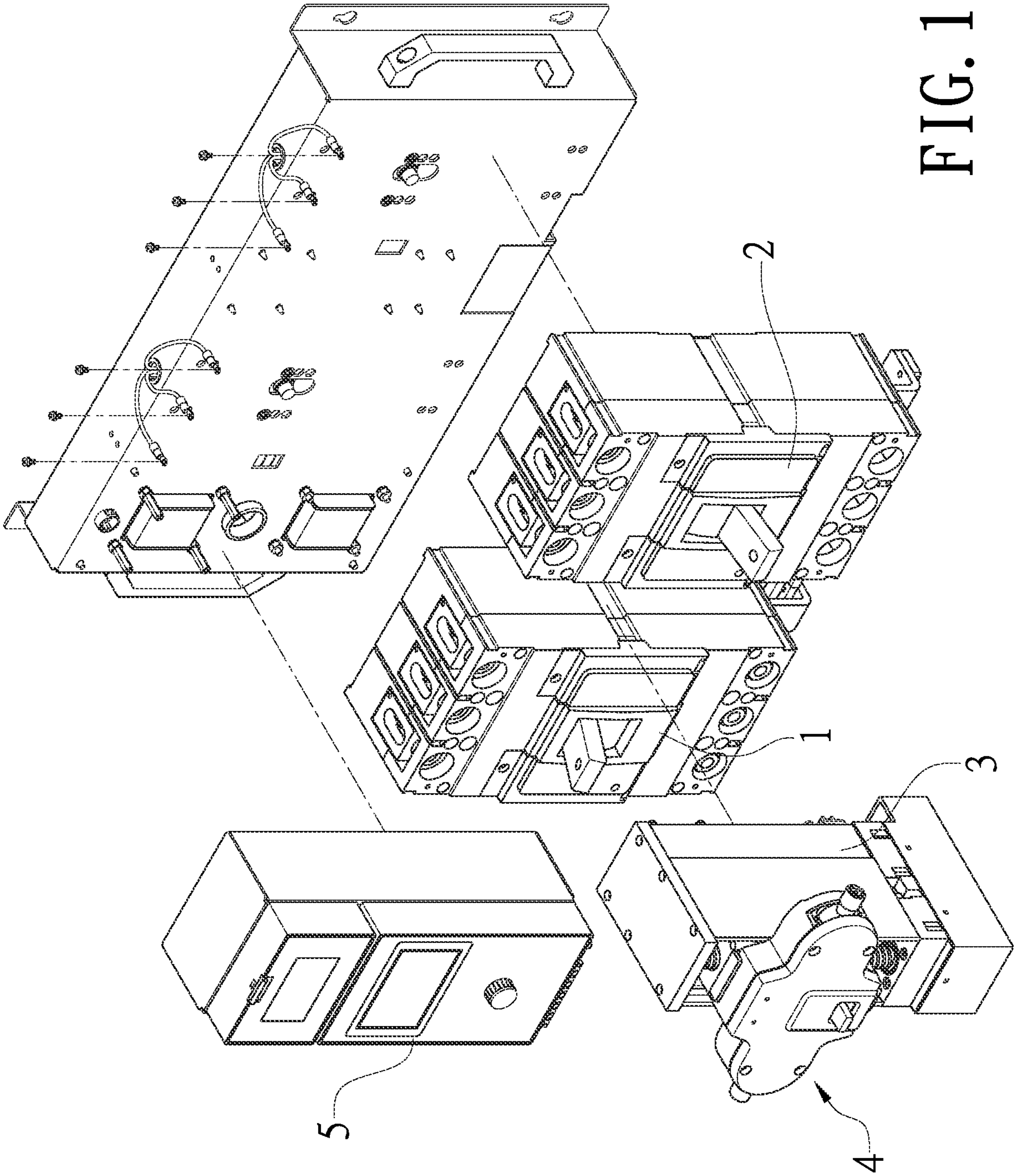
FIG. 1 is a schematic drawing showing respective main components of an embodiment before assembly according to the present invention.
Figure 2:
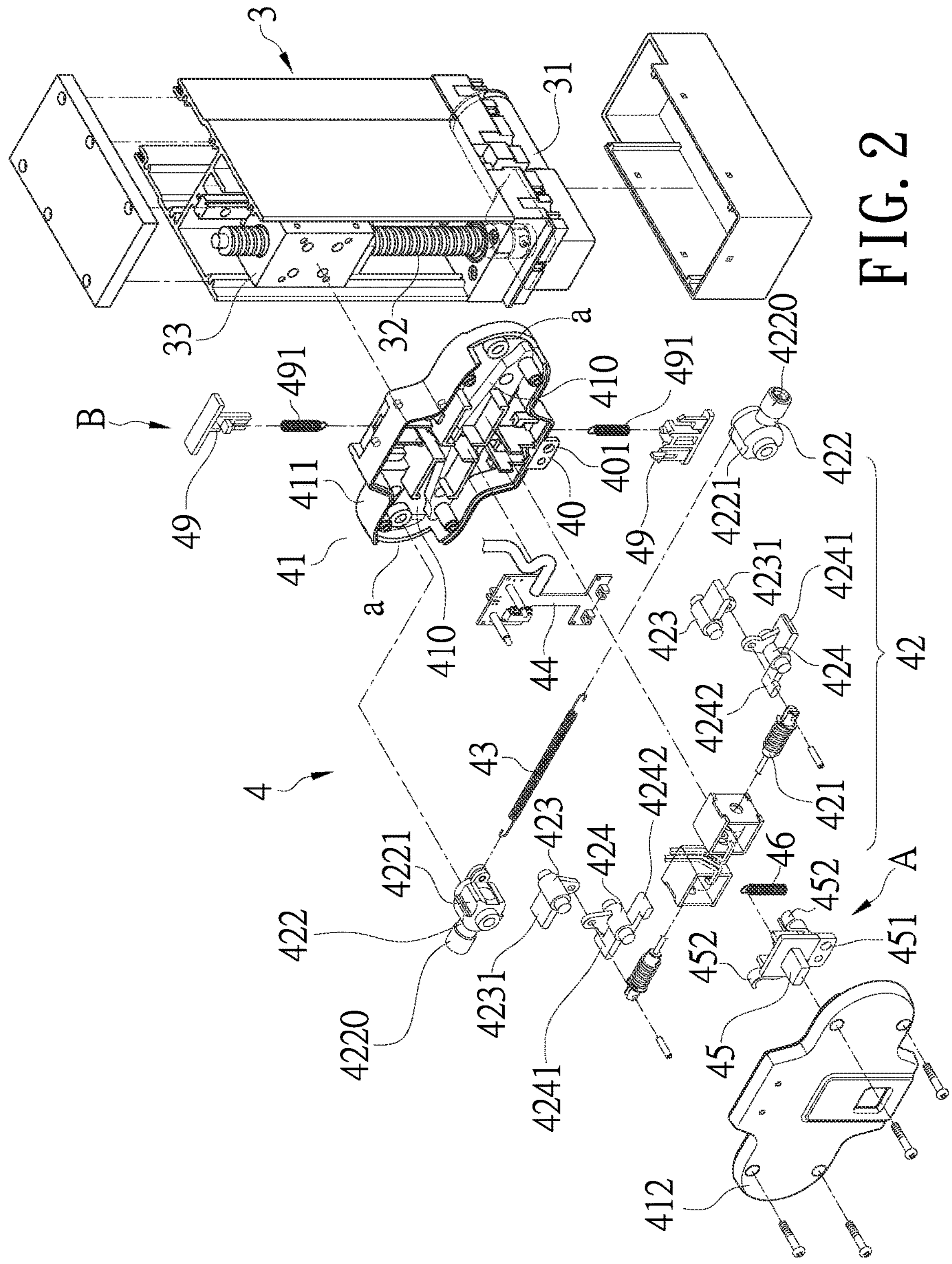
FIG. 2 is an exploded view of an embodiment according to the present invention.

Refer to FIG. 1 and FIG. 2, an automatic transfer switch according to the present invention is mainly disposed between a first power switch 1 and a second power switch 2 for control of transfer between the first and the second power switches 1, 2 by pushing and pulling. The automatic transfer switch includes a displacement mechanism 3 arranged between the first and the second power switches 1, 2 and a transfer module 4 disposed on and driven by the displacement mechanism 3 to move linearly.

The transfer module 4 is provided with a seat 41 which consists of two mounting areas 410 extending toward the first power switch 1 and the second power switch 2 to form two openings (a). A lever 422 is mounted in each of the mounting areas 410 while one end of the lever 422 is exposed through the opening (a) and a bearing 4220 is fitted to the end. The two levers 422 are electrically connected with a controller 5 which is used for control of the two levers 422 to be in a locked state for pushing and pulling the first power switch 1 or the second power switch 2, or in a released state to pass the first power switch 1 or the second power switch 2.

As shown in FIG. 1-6, how the above lever 422 is locked or released is described in the following embodiments. A toggle part 42 is mounted in each of the two mounting areas 410 and composed of an electrically controlled braking member 421, the lever 422 pivotally mounted in the seat 41 and exposed through the opening (a), a first locking member 423, and a second lock member 424. The first and the second locking members 423, 424 are not only pivotally connected with and positioned by the braking member 421 but also mounted in the seat 41 and located at two sides of the lever 422 correspondingly. Each of the two sides of the lever 422 is provided with a recess 4221. The first locking member 423 and the second locking member 424 are respectively provided with a locking end 4231 and a locking end 4241 corresponding to the recesses 4221 and able to be separated from or locked and limited in the recesses 4221 correspondingly for allowing the lever 422 to be locked or released.

While being assembled, the displacement mechanism 3 is arranged between the first and the second power switches 1, 2. The displacement mechanism 3 mainly includes a power source 31, a transmission shaft 32 disposed on an output shaft end of the power source 31, and a mobile seat 33 arranged at the transmission shaft 32. The transfer module 4 is disposed on the mobile seat 33 correspondingly. The power source 31 drives the transmission shaft 32 to drive the mobile seat 33 to move so that the transfer module 4 is further moved and having displacement.

The seat 41 of the transfer module 4 further consists of a base 411 and a cover 412 while the toggle part 42 is mounted in the base 411. A circuit board 44 is mounted in the base 411 of the seat 41 and electrically connected with both the braking member 421 and the controller 5. The braking member 421 can be either an electromagnetic brake such as electromagnet (as shown in figure) or a mechanical brake. The controller 5 is further connected with the power source 31 of the displacement mechanism 3. Thus the power source 31 and the braking member 421 are turned on and off under control of the controller 5. Then the toggle part 42 is mounted in each of the two mounting areas 410 of the seat 41 and the lever 422 is pivotally mounted in and located at the opening (a) of the seat 41. A return spring 43 is connected between the two levers 422. Next the first and the second locking members 423, 424 are mounted in the seat 41 and corresponding to a back side of the levers 422. Both the first and the second locking members 423, 424 are provided with a pivot lug used for pivotally connected with and positioned by one end of the corresponding braking members 421.

Figure 3:
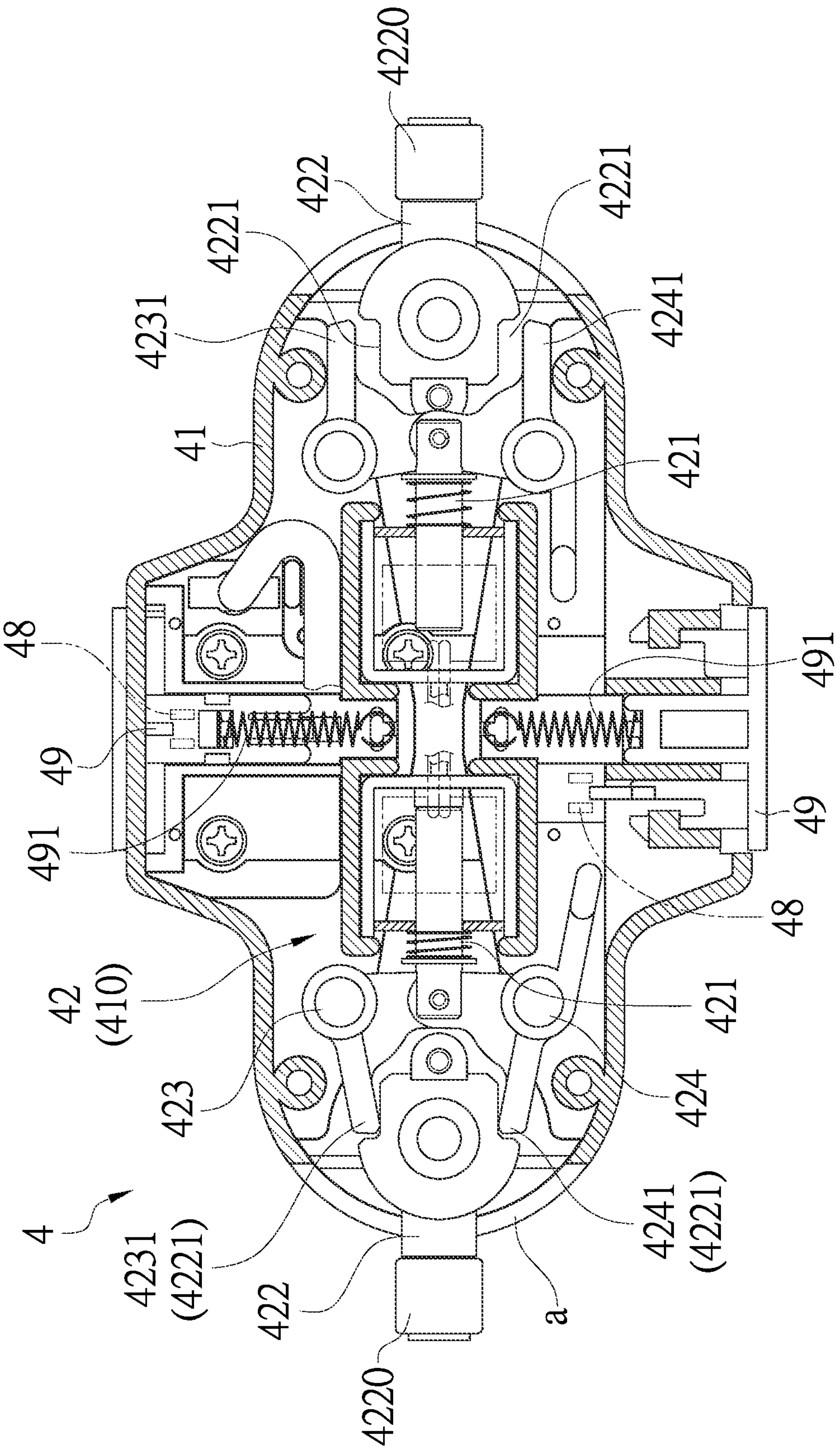
FIG. 3 is a sectional view of a transfer module of an embodiment according to the present invention.
Figure 4:
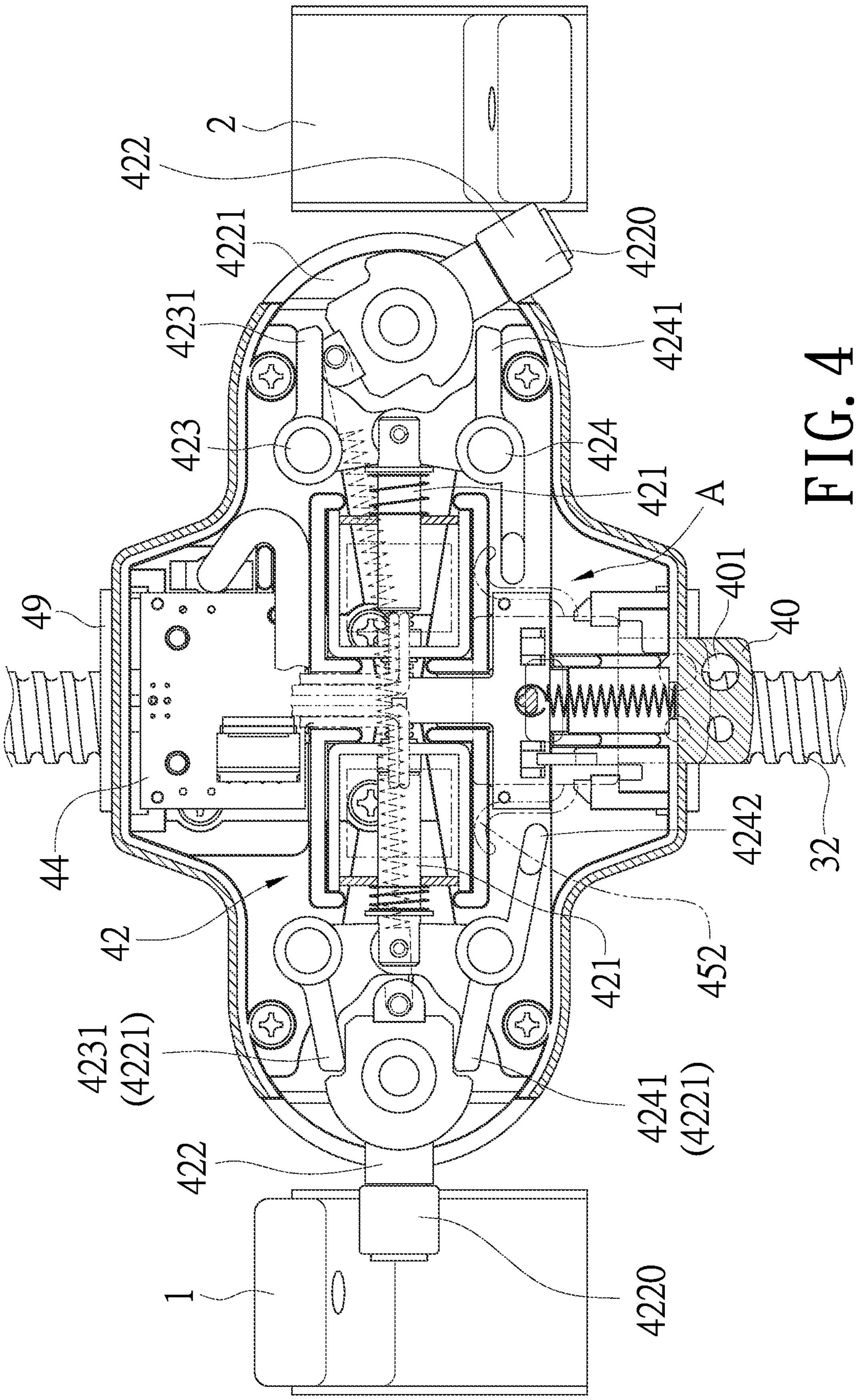
FIG. 4 is a schematic drawing showing how toggle parts of a transfer module work in an embodiment according to the present invention.
Figure 5:
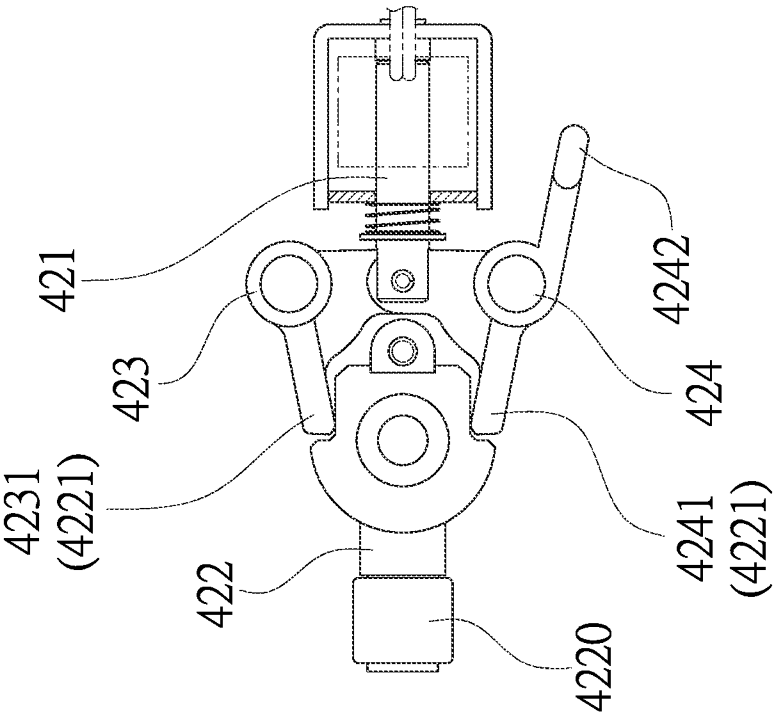
FIG. 5 is a schematic drawing showing a toggle part in an excited state on the left side of the embodiment in FIG. 4 according to the present invention.
Figure 6:
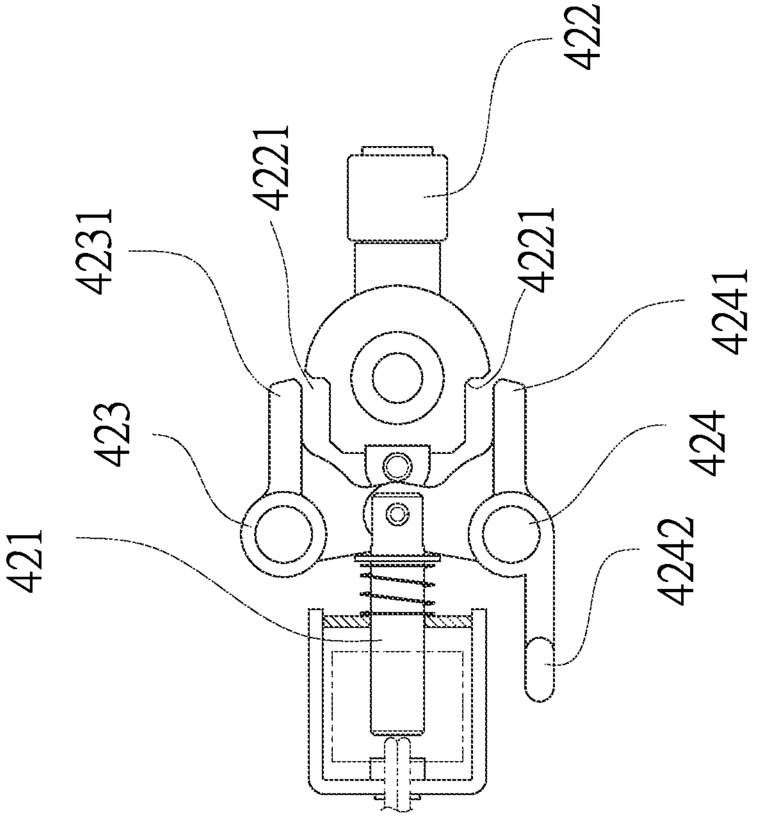
FIG. 6 is a schematic drawing showing a toggle part in a magnetic-off state on the right side of the embodiment in FIG. 4 according to the present invention.

How the transfer module 4 works is described in the followings. The transfer between the first power switch 1 and the second power switch 2 is carried out by changes in excitation of the braking members 421 of the two toggle parts 42. Refer to FIG. 3 and FIG. 4, the left side of the figure shows the toggle part 42 is in a magnetically excited state. A power is applied under control of the circuit board 44 so that the braking member 421 is magnetically excited and moved inward to drive the first and the second locking members 423, 424 rotating (such as rotating inward and toward each other for clipping). Thus the locking ends 4231, 4241 are moved toward the recesses 4221 to be locked in the recesses 4221 of the lever 422 correspondingly for limiting and positioning the levers 422 (unable to be rotated). The locked lever 422 can pull a handle of the power switch 1 while being driven by the displacement mechanism 3 (as shown in FIG. 4 and FIG. 5). In contrast, the toggle part 42 on the right side of the figures is in a magnetic-off state and the power is off under control of the circuit board 44 so that the braking member 421 is not attracted by magnetic field and then moved outward to drive the first and the second locking members 423, 424 rotating (such as rotating outward, away from each other for extending). Thus the locking ends 4231, 4241 are released from the recesses 4221 correspondingly and the lever 422 is free (as shown in FIG. 4 and FIG. 6). After being driven by the displacement mechanism 3 and contacted with a handle of the power switch 2, the lever 422 is still rotated and passed. Then the return spring 43 connected between the levers 422 of the two toggle parts 42 is moved along with the free lever 422. Thus the released and rotated levers 422 are turned back to their original positions by the return spring 43.

Figure 7:
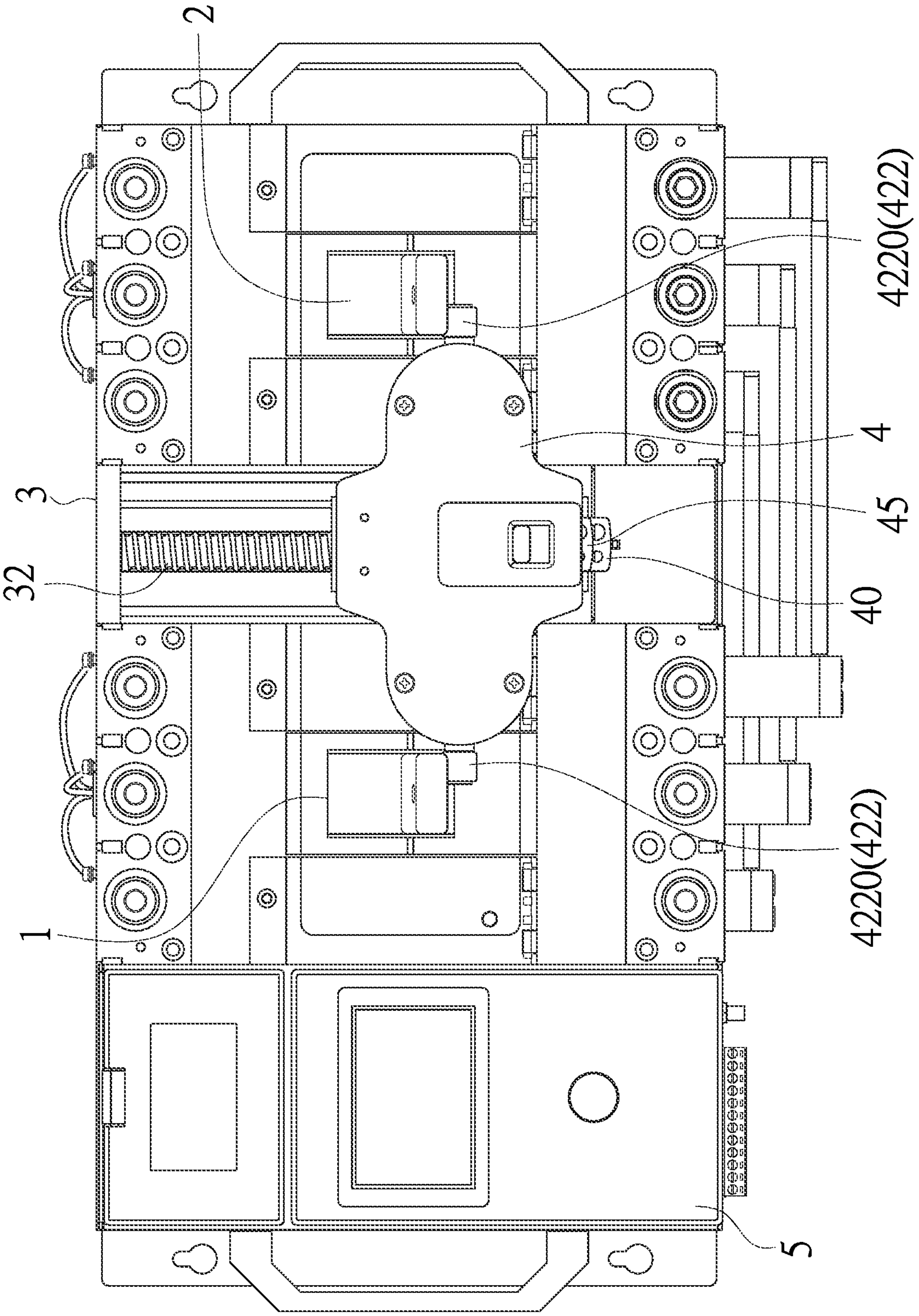
FIG. 7 is a schematic drawing showing switching and operation of an embodiment according to the present invention.
Figure 8:
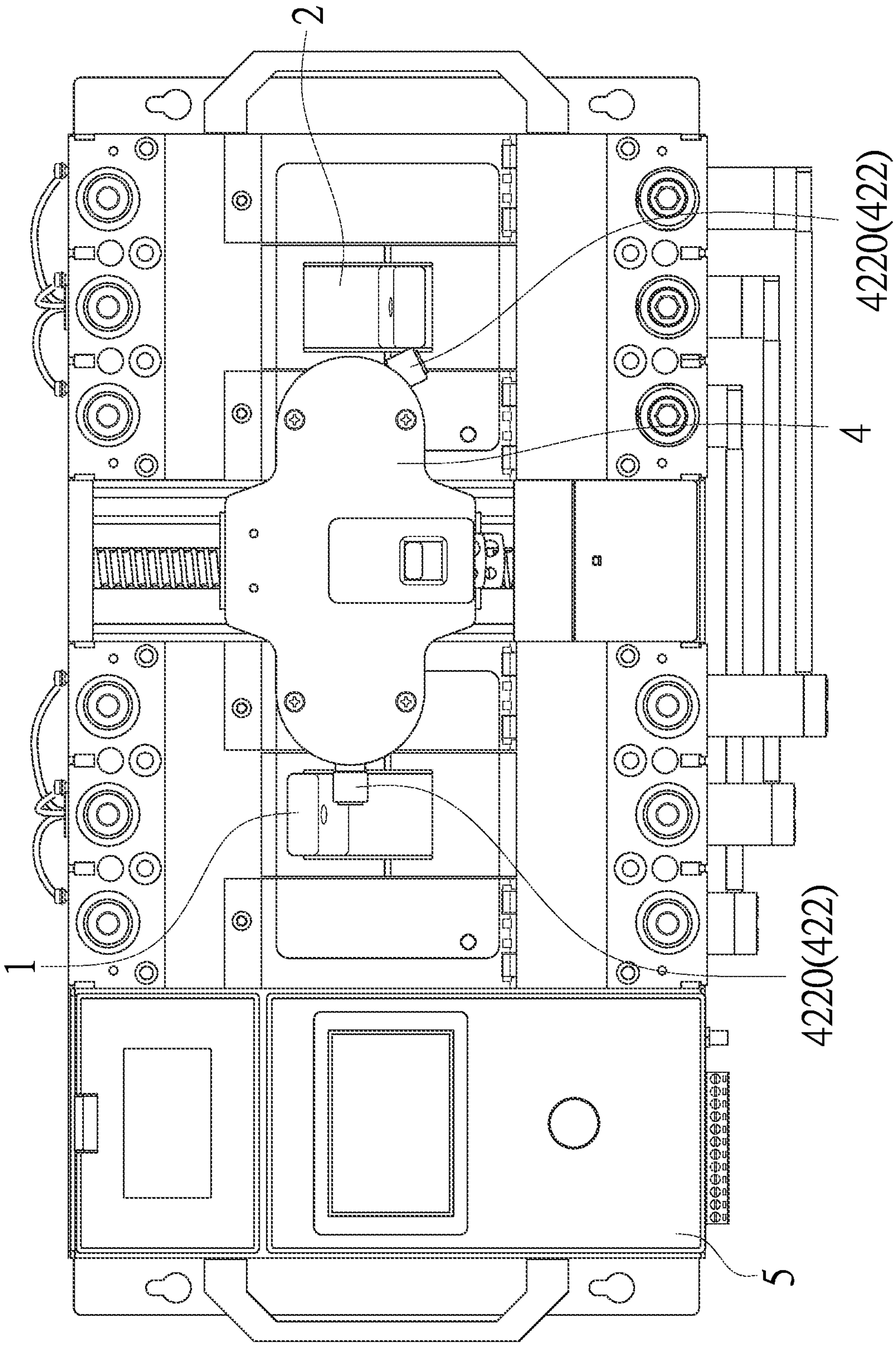
FIG. 8 is another schematic drawing showing switching and operation of an embodiment according to the present invention.
Figure 9:
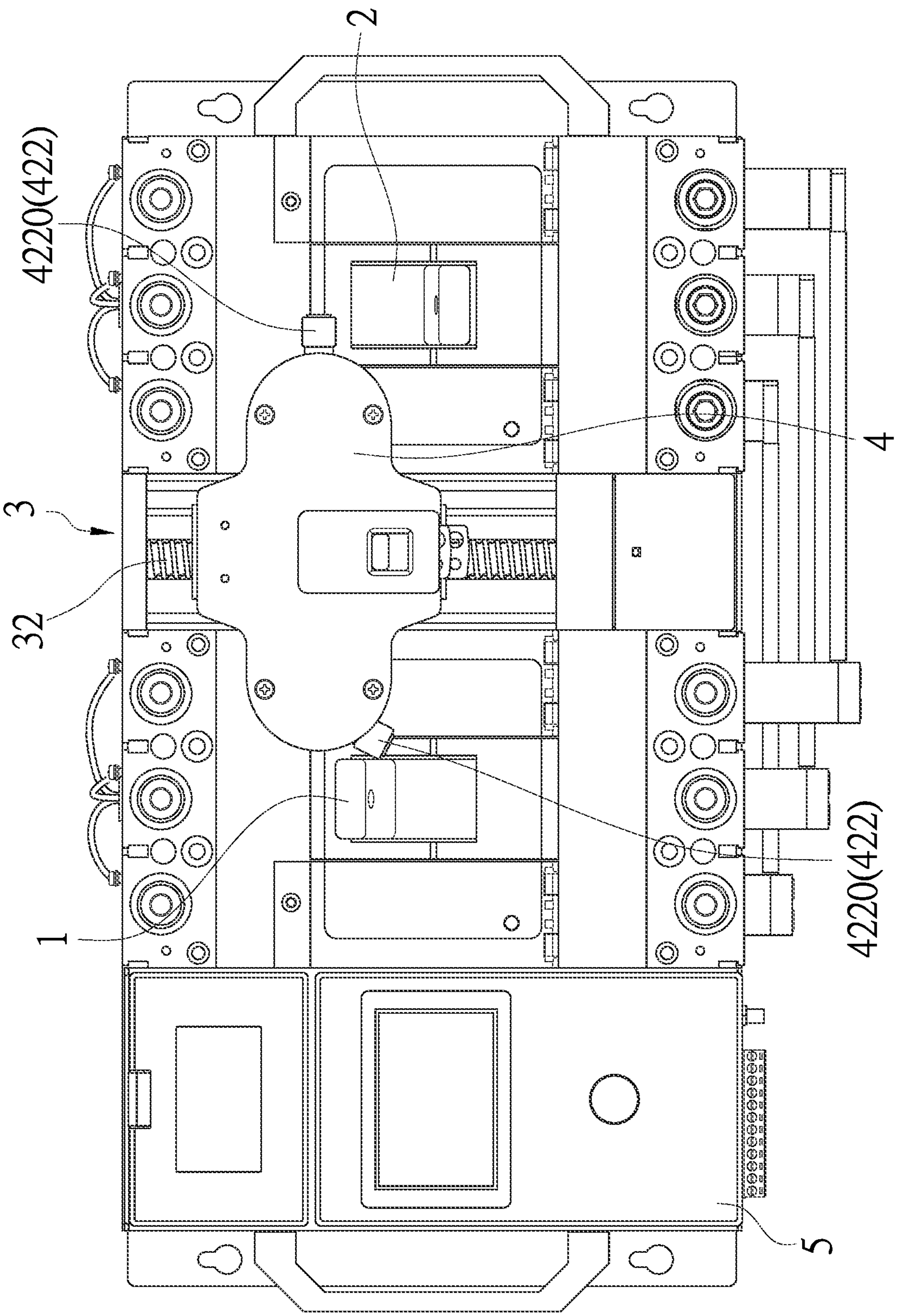
FIG. 9 is a further schematic drawing showing switching and operation of an embodiment according to the present invention.
Figure 10:
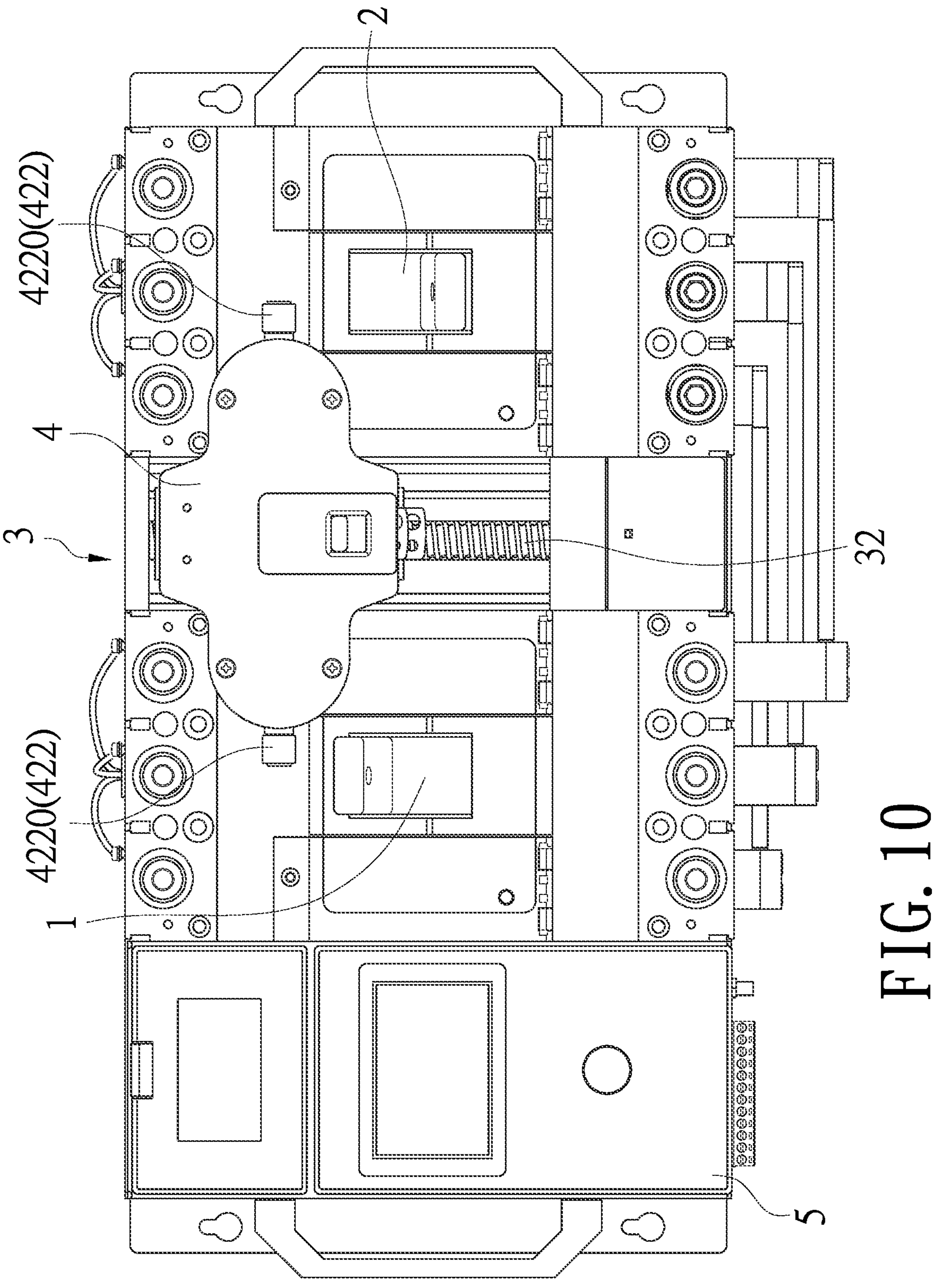
FIG. 10 is a further schematic drawing showing switching and operation of an embodiment according to the present invention.
Figure 11:
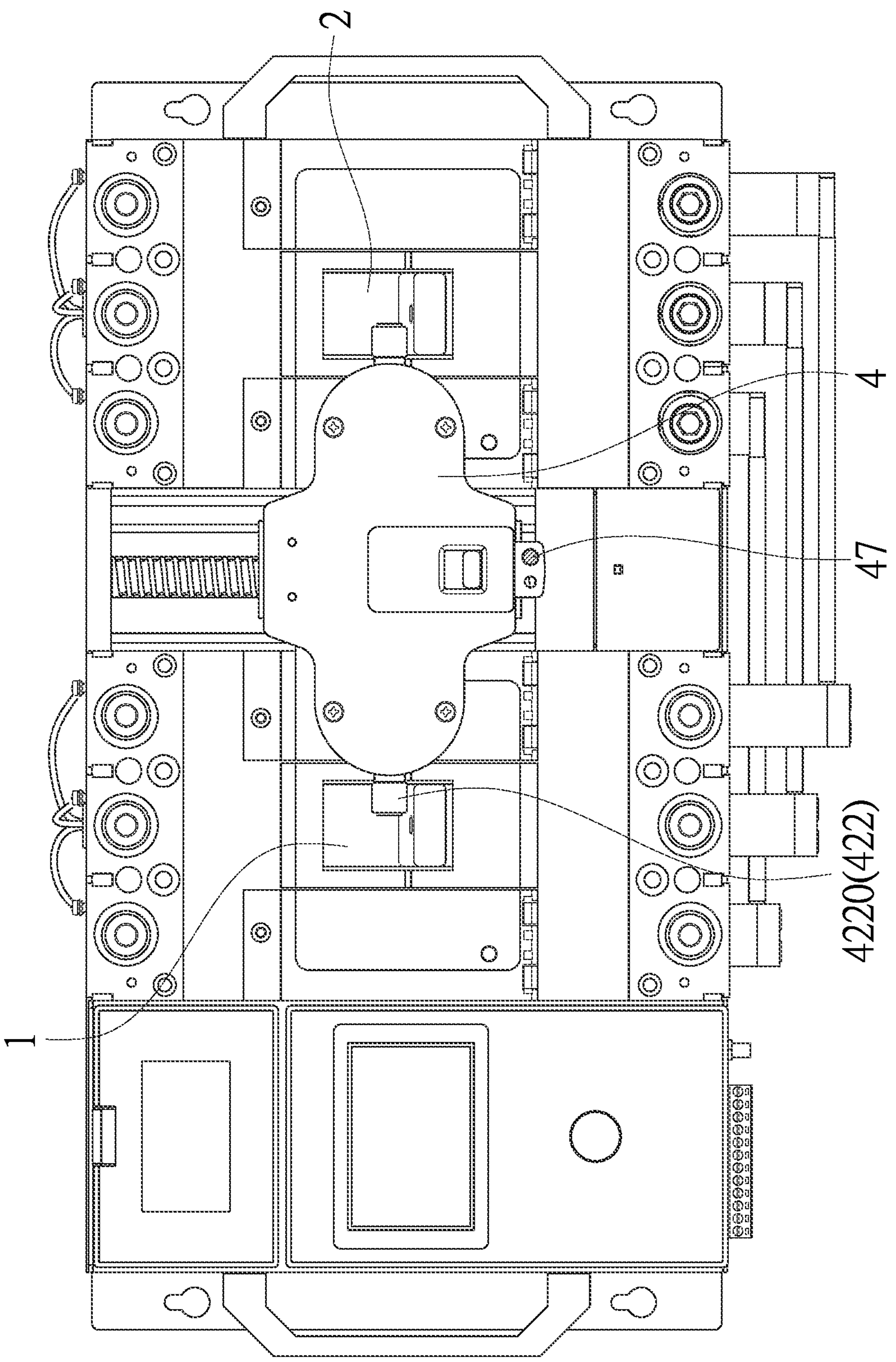
FIG. 11 is a schematic drawing showing a safety mode of an embodiment according to the present invention.
Figure 12:
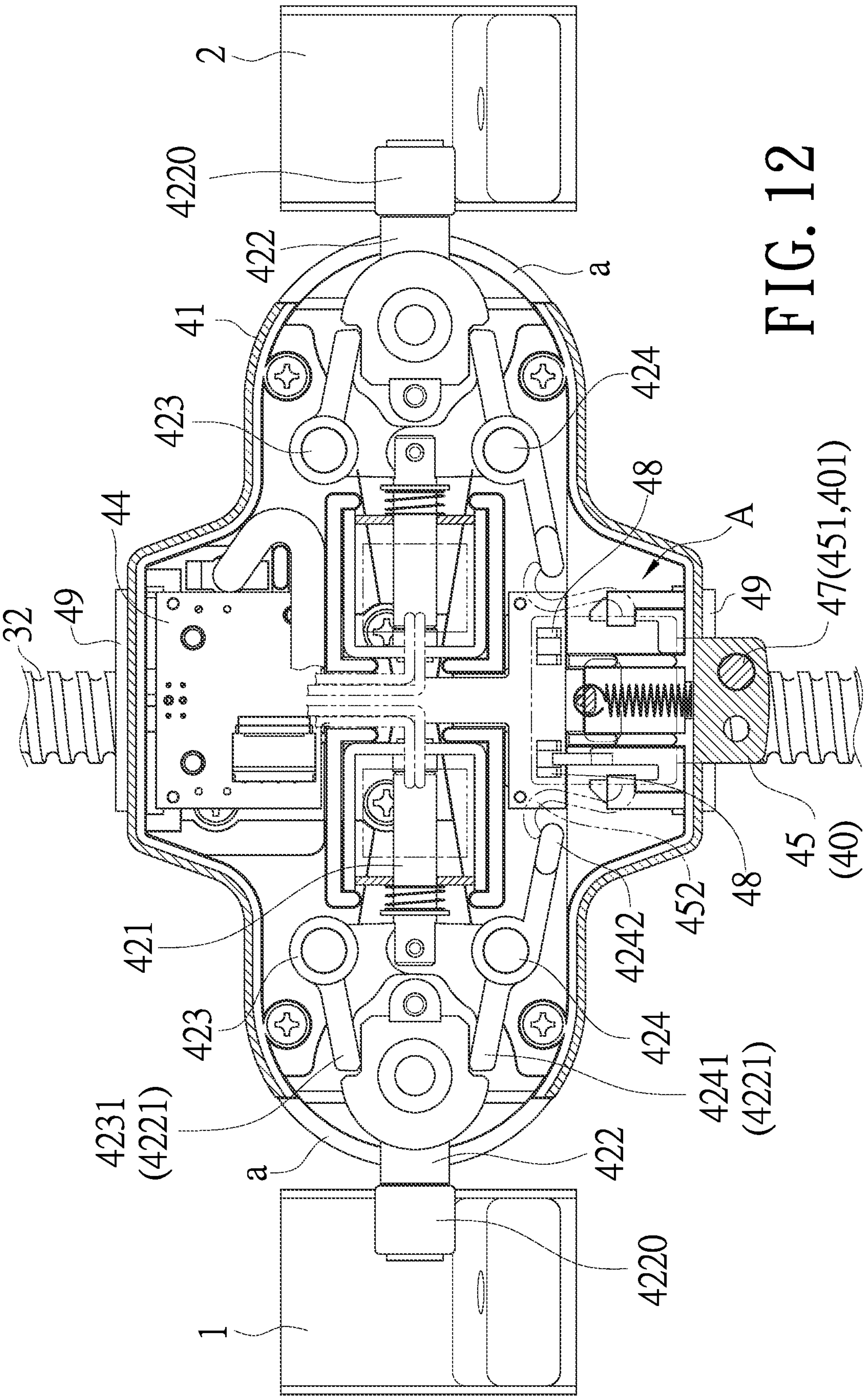
FIG. 12 is a sectional view of a locking mechanism of an embodiment according to the present invention.

Refer to FIG. 7-10, the displacement mechanism 3 is disposed between the first power switch 1 on the left side and the second power switch 2 on the right side while the transfer module 4 is arranged at the mobile seat 33 of the displacement mechanism 3. While in use, for example, power is from the standby power source when the normal power source is off. After completing maintenance, the normal power source is available and going to be activated. In practice, a flow chart showing steps of pulling the handle of the first power switch 1 (of the normal power source) upward is described in the followings. Refer to FIG. 7, both the handle of the first power switch 1 and the handle of the second power switch 2 are at a lower position of the power switches 1, 2 (the power is not supplied by the normal power source yet and the standby power source is off) and the transfer module 4 is located at a home position at a lower part of the automatic transfer switch. After the standby power source being turned off, the controller 5 calculates and controls a time point at which the normal power source is activated and a switching time is set according to user' needs for control of the toggle part 42 on the left side to be excited. Thus the lever 422 on the left side is further locked while the toggle part 42 on the right side is power-off and released and thus the lever 422 on the right side is free. Then the transfer module 4 is driven by the displacement mechanism 3 to move upward linearly, as shown in FIG. 8. The locked lever 422 on the left side pushes the handle of the first power switch 1 to move upward while the free lever 422 on the right side is pushed by an edge of the handle of the power switch 2 to be rotated and passed after being in contact with the handle of the power switch 2. Refer to FIG. 9, when the displacement mechanism 3 keeps driving the transfer module 4 to move upward linearly, the return spring 43 returns the rotated lever 422 on the right side to the original position after the free lever 422 on the right side being rotated. As to the lever 422 on the left side, it contacts the handle of the first power switch 1 while still moving upward. At the moment, the toggle part 42 on the left side is de-energized and released so that the lever 422 on the left side is switched to a free state and in contact with the first power switch 1 (such as the normal power source) already being pulled upward. Then the lever 422 on the left side is pushed by an edge of the handle to be rotated and passed. Next the lever 422 on the left side is turned back to its original position by the return spring 43 (as shown in FIG. 10). Then the transfer module 4 can be driven by the displacement mechanism 3 to move downward linearly and back to the home position to keep power supply from the normal power source when the two levers 422 are both in the free state.

Figure 13:
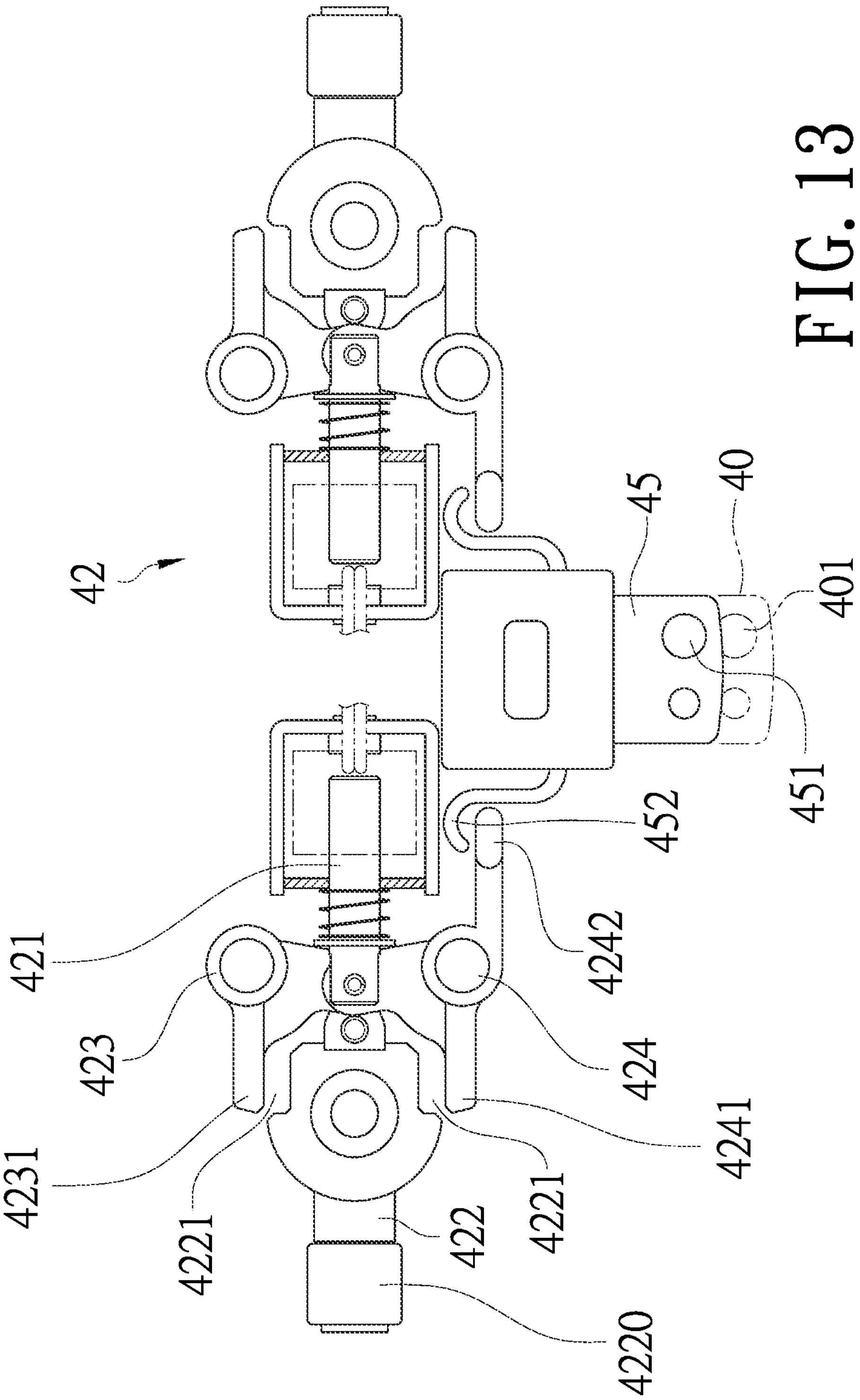
FIG. 13 is a schematic drawing showing locking holes of a locking mechanism in staggered state of an embodiment according to the present invention.
Figure 14:
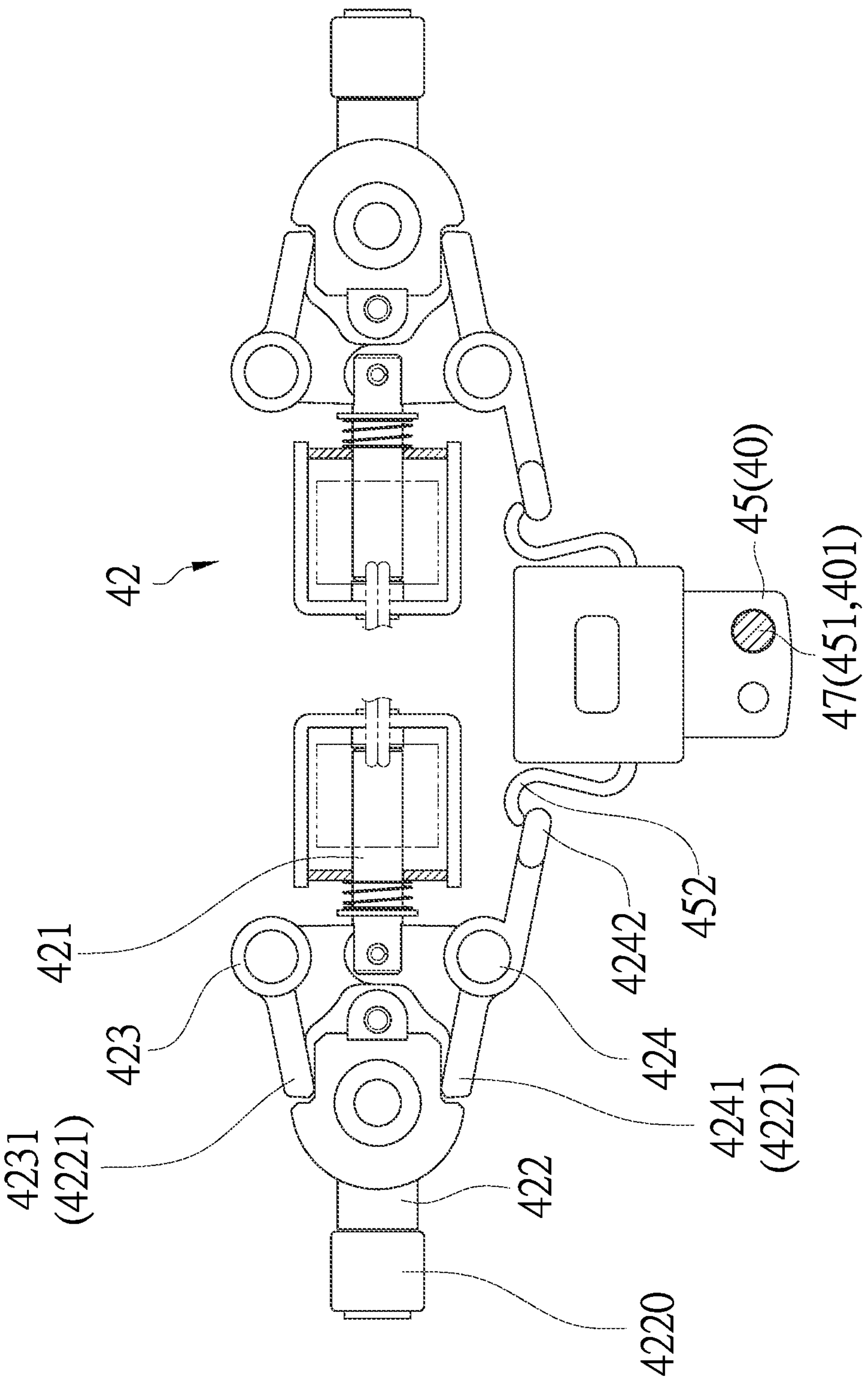
FIG. 14 is a schematic drawing showing locking holes of a locking mechanism in aligned and locked state of an embodiment according to the present invention.

Refer to FIG. 11-14, the controller 5 of the present invention is further set with a safety mode. Under such mode, power is off during equipment or power supply system maintenance. The first and the second power source switches 1, 2 are turned off by the levers 422 mentioned above, At the same time, the transfer module 4 is controlled to be located between the handles of the first and the second power source switches 1, 2. A locking mechanism A is further provided for control of the second power source switches 1, 2 to be off under the safety mode. The locking mechanism A consists of a fixing piece 40 connected with an outer wall of the seat 41 and provided with a first locking hole 401 while the seat 41 is provided with a sliding moveable locking member 45 corresponding to the fixing piece 40. A second locking hole 451 is disposed on the moveable locking member 45 and either aligned or staggered with the first locking hole 401 (in the staggered state as shown in FIG. 13 or in the aligned state as shown in FIG. 14). The moveable locking member 45 is further provided with two locking portions 452 corresponding to the two second locking members 424 while each of the second locking members 424 is provided with a lock end 4242 corresponding to the locking portion 452. The moveable locking member 45 is connected with a first elastic member 46 having one end positioned in the seat 41. A positioning member 47 can be mounted into the first and the second locking holes 401, 451 and locked therein (as shown in FIG. 14). By the locking portion 452 of the moveable locking member 45 that limits the lock end 4242, the second locking member 424 and the first locking member 423 moved together therewith are maintained at an inward and clipping state. Thereby the locking ends 4231, 4241 of the first and the second locking members 423, 424 are locked in the recesses 4221 of the levers 422 correspondingly. Thus the two levers 422 are locked and the handles of the first and the second power switches 1, 2 are limited, unable to be pulled. Therefore, effective safety lock is achieved.

Figure 15:
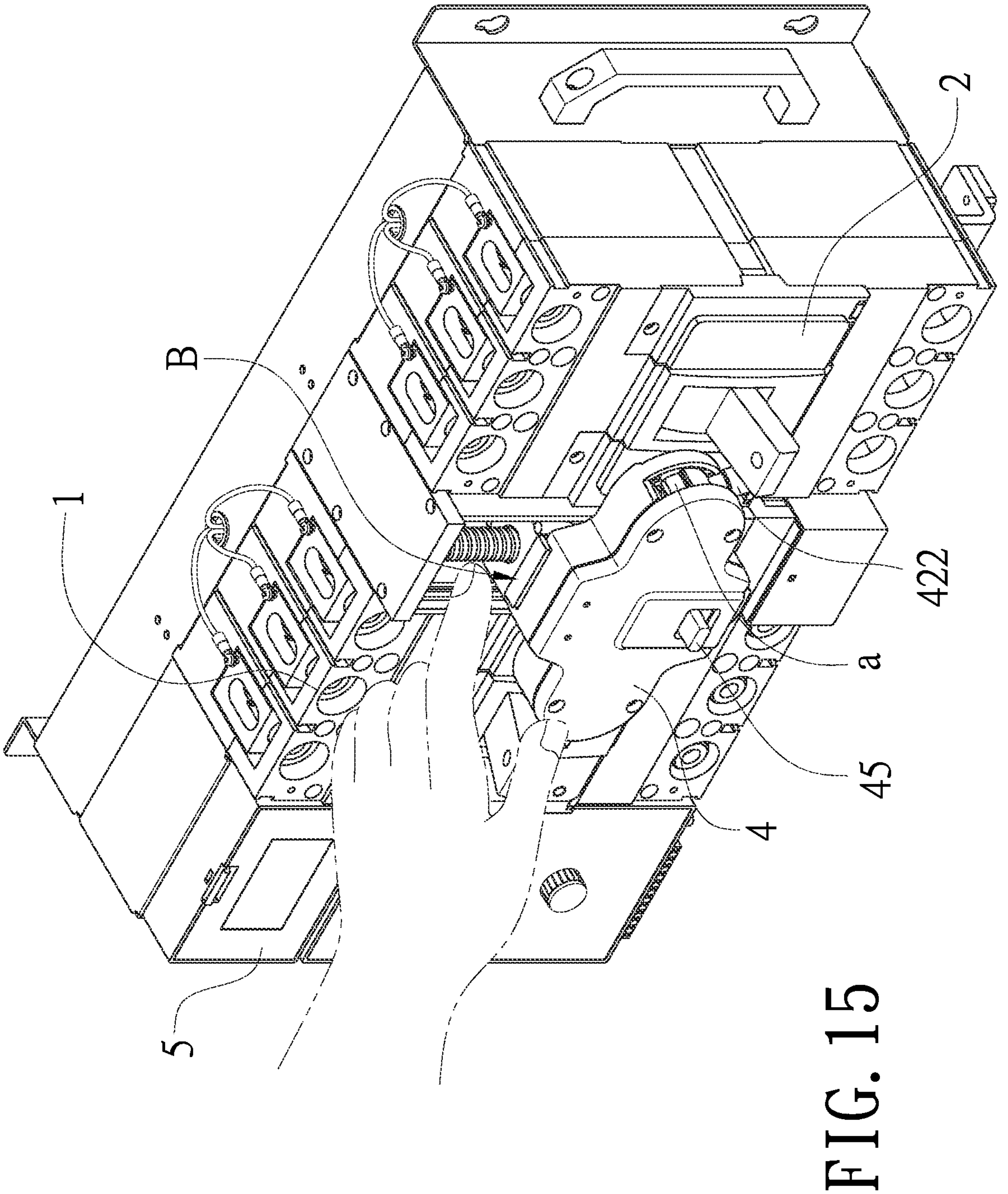
FIG. 15 is a schematic drawing showing anti-pinch sensing of an embodiment according to the present invention.

Refer to FIG. 15, during switching and operation of the transfer module 4, a safety design for protecting staff from accidentally touching the transfer module 4 is provided. An anti-pinch sensing unit B is disposed on an outer surface of both two ends of the seat 41 in direction of linear movement of the seat 41 and electrically connected with the controller 5. The anti-pinch sensing unit B can be an infrared sensor or light shielding sensor 48. As shown in FIG. 2, FIG. 3, and FIG. 15, the light shielding sensor 48 is mounted in the seat 41 while a moveable trigger 49 corresponding to the light shielding sensor 48 is mounted on the seat 41 and one end of the trigger 49 is connected with a second elastic member 491. One end of the second elastic member 491 is positioned in the seat 41. When the staff's hand is in contact with the trigger 49, the trigger 49 is pushed to move and the light shielding sensor 48 is further shielded and thus sending messages to the controller 5 for control of the transfer module 4 to stop working.

Moreover, the light shielding sensor is also used to connect with the controller 5 in the locking mechanism A. That means a shielding piece is disposed on the moveable locking member 45 while the seat 41 is provided with the light shielding sensor therein and corresponding to the shielding piece. By movement of the moveable locking member 45, signals are formed between the shielding piece and the light shielding sensor and sent to the controller 5 for the following operation.

The automatic transfer switch according to the present invention has the following advantages.

1. By the levers being locked or released to pull or push the power switch selectively in combination with the controller used for setting a time delay during transfer between the power sources, the power switch can be turned on/off or switched at the time required.

2. When the automatic transfer switch is out of order, the power-off lever is in the released state and the power switch can be manually operated. Thus problems of conventional automatic transfer switches such as being locked during and unable to be operated during transferring between the power sources can be avoided.

3. The locking mechanism of the present invention can disconnect power supply and keep the power switches off under the safety mode during maintenance of equipment or power supply system. Thereby the power switches will not be turned on accidentally.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An automatic transfer switch which is disposed between a first power switch and a second power switch for control of switching between the first and the second power switches by pushing and pulling comprising:

a displacement mechanism arranged between the first and the second power switches; and a transfer module disposed on the displacement mechanism and driven by the displacement mechanism to move linearly; the transfer module including a seat which consists of two mounting areas extending toward the first power switch and the second power switch to form openings, a lever mounted in each of the mounting areas and one end of the lever exposed through the opening, and a controller electrically connected with the two levers and used for control of the two levers to be in a locked state for pushing and pulling the first power switch or the second power switch, or in a released state to pass the first power switch or the second power switch.

2. The automatic transfer switch as claimed in claim 1, wherein a toggle part is mounted in each of the two mounting areas of the seat and each of the two toggle parts are composed of an electrically controlled braking member, a first locking member, a second locking member pivotally connected with and positioned by the braking member, and the lever wherein the lever is located between the first locking member and the second locking member; each of two sides of the lever is provided with a recess while the first locking member and the second locking member are both provided with a locking end corresponding to the recess and able to be separated from or locked and limited in the recess correspondingly for allowing the lever to be locked or released.

3. The automatic transfer switch as claimed in claim 2, wherein a circuit board is mounted in the seat and electrically connected with both the braking member and the controller; the controller is connected with a power source of the displacement mechanism so that the power source and the braking member are turned on and off under control of the controller.

4. The automatic transfer switch as claimed in claim 3, wherein a locking mechanism is further provided; the locking mechanism includes a fixing piece connected with an outer wall of the seat and provided with a first locking hole, a sliding moveable locking member mounted to the seat and corresponding to the fixing piece and provided with a second locking hole either aligned or staggered with the first locking hole, and two locking portions corresponding to two second locking members while each of the second locking members are provided with a lock end corresponding to the respective locking portion, and a first elastic member connected with the moveable locking member and having one end positioned in the seat; wherein a positioning member is able to be mounted into the first locking hole and the second locking hole and locked therein.

5. The automatic transfer switch as claimed in claim 3, wherein the displacement mechanism includes a power source, a transmission shaft disposed on an output shaft end of the power source, and a mobile seat arranged at the transmission shaft; the transfer module is disposed on the mobile seat correspondingly.

6. The automatic transfer switch as claimed in claim 3, wherein an anti-pinch sensing unit is disposed on an outer surface of each of two ends of the seat in a direction of linear movement of the seat and the anti-pinch sensing unit is electrically connected with the controller.

7. The automatic transfer switch as claimed in claim 6, wherein the anti-pinch sensing unit is a light shielding sensor which is mounted on the seat; a moveable trigger corresponding to the light shielding sensor is mounted on the seat and one end of the trigger is connected with a second elastic member while one end of the second elastic member is positioned in the seat; the trigger is pushed to move and the light shielding sensor is further shielded by the trigger and thus sending messages to the controller for control of the transfer module to stop working.

8. The automatic transfer switch as claimed in claim 2, wherein a return spring is connected between the levers of the two toggle parts.

9. The automatic transfer switch as claimed in claim 1, wherein a locking mechanism is further provided; the locking mechanism includes a fixing piece connected with an outer wall of the seat and provided with a first locking hole, a sliding moveable locking member mounted to the seat and corresponding to the fixing piece and provided with a second locking hole either aligned or staggered with the first locking hole, and two locking portions corresponding to two second locking members while each of the second locking members are provided with a lock end corresponding to the respective locking portion, and a first elastic member connected with the moveable locking member and having one end positioned in the seat; wherein a positioning member is able to be mounted into the first locking hole and the second locking hole and locked therein.

10. The automatic transfer switch as claimed in claim 1, wherein the displacement mechanism includes a power source, a transmission shaft disposed on an output shaft end of the power source, and a mobile seat arranged at the transmission shaft; the transfer module is disposed on the mobile seat correspondingly.

11. The automatic transfer switch as claimed in claim 1, wherein an anti-pinch sensing unit is disposed on an outer surface of each of two ends of the seat in a direction of linear movement of the seat and the anti-pinch sensing unit is electrically connected with the controller.

12. The automatic transfer switch as claimed in claim 1, wherein a bearing is mounted to each of the levers and corresponding to the first power switch and the second power switch.

13. The automatic transfer switch as claimed in claim 1, wherein the braking member is an electromagnetic brake.

* * * * *